(12) United States Patent
Putnam

(10) Patent No.: US 9,873,083 B1
(45) Date of Patent: Jan. 23, 2018

(54) WASTEWATER PUMP STATION VENTING SYSTEM AND METHOD

(71) Applicant: David Putnam, Calhoun, LA (US)

(72) Inventor: David Putnam, Calhoun, LA (US)

( * ) Notice: Subject to any disclaimer, the term of this patent is extended or adjusted under 35 U.S.C. 154(b) by 505 days.

(21) Appl. No.: 14/215,704

(22) Filed: Mar. 17, 2014

(51) Int. Cl.
*B01D 53/74* (2006.01)
*B01D 19/00* (2006.01)

(52) U.S. Cl.
CPC ......... *B01D 53/74* (2013.01); *B01D 19/0036* (2013.01)

(58) Field of Classification Search
CPC ...................................................... B01D 53/74
USPC .................................. 454/237–368; 210/158
See application file for complete search history.

(56) References Cited

U.S. PATENT DOCUMENTS

| | | | |
|---|---|---|---|
| 2,896,061 A | 7/1959 | McMillan | |
| 3,936,281 A | 2/1976 | Kurmeier | |
| 4,421,534 A | 12/1983 | Walker | |
| 5,127,878 A * | 7/1992 | Meckler | F24F 1/01 454/264 |
| 5,316,569 A | 5/1994 | Heunermund | |
| 6,245,554 B1 | 6/2001 | Durham | |
| 6,540,605 B1 * | 4/2003 | Lesage | F24F 7/065 454/231 |
| 6,649,055 B1 * | 11/2003 | Whitton | F04D 7/08 137/343 |
| 7,866,334 B2 | 1/2011 | McIntire | |
| 2010/0170836 A1 | 7/2010 | Pagano et al. | |
| 2012/0252348 A1 * | 10/2012 | Rheaume | F24F 7/025 454/343 |

* cited by examiner

*Primary Examiner* — Steven B McAllister
*Assistant Examiner* — Ko-Wei Lin
(74) *Attorney, Agent, or Firm* — R. Keith Harrison

(57) ABSTRACT

A wastewater pump station venting system includes at least one wastewater discharge conduit; a wastewater pump station having a station interior disposed in fluid communication with the wastewater discharge conduit; at least one fresh air inlet conduit disposed in fluid communication with the station interior; at least one gas vent conduit having a vent conduit inlet segment disposed in fluid communication with the station interior and a vent conduit outlet segment disposed in fluid communication with the vent conduit inlet segment; at least one vent air inlet conduit disposed in fluid communication with the gas vent conduit between the vent conduit inlet segment and the vent conduit outlet segment, the vent air inlet conduit disposed at an acute angle relative to the vent conduit inlet segment and an obtuse angle relative to the vent conduit outlet segment; at least one vent fan disposed in fluid communication with the vent air inlet conduit; and at least one power source electrically interfacing with the vent fan. A wastewater pump station venting method is also disclosed.

21 Claims, 9 Drawing Sheets

WASTEWATER PUMP STATION VENTING SYSTEM AND METHOD

FIELD

Illustrative embodiments of the disclosure generally relate to wastewater treatment systems. More particularly, illustrative embodiments of the disclosure relate to an enhanced efficiency wastewater pump station venting system and method which enhance longevity and reduce the maintenance needs of a wastewater pump station in a wastewater treatment system.

BACKGROUND

The background description provided herein is solely for the purpose of generally presenting the context of the illustrative embodiments of the disclosure. Aspects of the background description are neither expressly nor impliedly admitted as prior art against the claimed subject matter.

Sanitary sewer systems may include multiple pump stations which pump wastewater from residences and businesses to a wastewater treatment facility through a network of conduits. Sewer gases such as hydrogen sulfide, ammonia, carbon dioxide and methane emanate from the wastewater as it flows through the pump stations. These sewer gases are corrosive to the structural and functional components of the pump stations. However, venting of the corrosive sewer gases from conventional pump stations may be inefficient such that the pump stations require frequent and extensive maintenance or replacement.

Therefore, an enhanced efficiency wastewater pump station venting system and method which enhance longevity and reduce the maintenance needs of a wastewater pump station in a wastewater treatment system are desirable.

SUMMARY

Illustrative embodiments of the disclosure are generally directed to a wastewater pump station venting system which enhances longevity and reduces the maintenance needs of a wastewater pump station in a wastewater treatment system. An illustrative embodiment of the wastewater pump station venting system includes at least one wastewater discharge conduit; a wastewater pump station having a station interior disposed in fluid communication with the wastewater discharge conduit; at least one fresh air inlet conduit disposed in fluid communication with the station interior; at least one gas vent conduit having a vent conduit inlet segment disposed in fluid communication with the station interior and a vent conduit outlet segment disposed in fluid communication with the vent conduit inlet segment; at least one vent air inlet conduit disposed in fluid communication with the gas vent conduit between the vent conduit inlet segment and the vent conduit outlet segment, the vent air inlet conduit disposed at an acute angle relative to the vent conduit inlet segment and an obtuse angle relative to the vent conduit outlet segment; at least one vent fan disposed in fluid communication with the vent air inlet conduit; and at least one power source electrically interfacing with the vent fan.

Illustrative embodiments of the disclosure are further generally directed to a wastewater pump station venting method. An illustrative embodiment of the wastewater pump station venting method includes positioning a vent fan outside a flow path for a stream of gas/air mixture to be discharged from a wastewater pump station, inducing reduced pressure in the flow path by directing a stream of vent air at an angle to the flow path via operation of the vent fan, discharging a stream of wastewater into the wastewater pump station, forming the stream of gas/air mixture in the wastewater pump station by discharging a stream of fresh air into the wastewater pump station and discharging the stream of gas/air mixture from the wastewater pump station along the flow path via the reduced pressure.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 1:
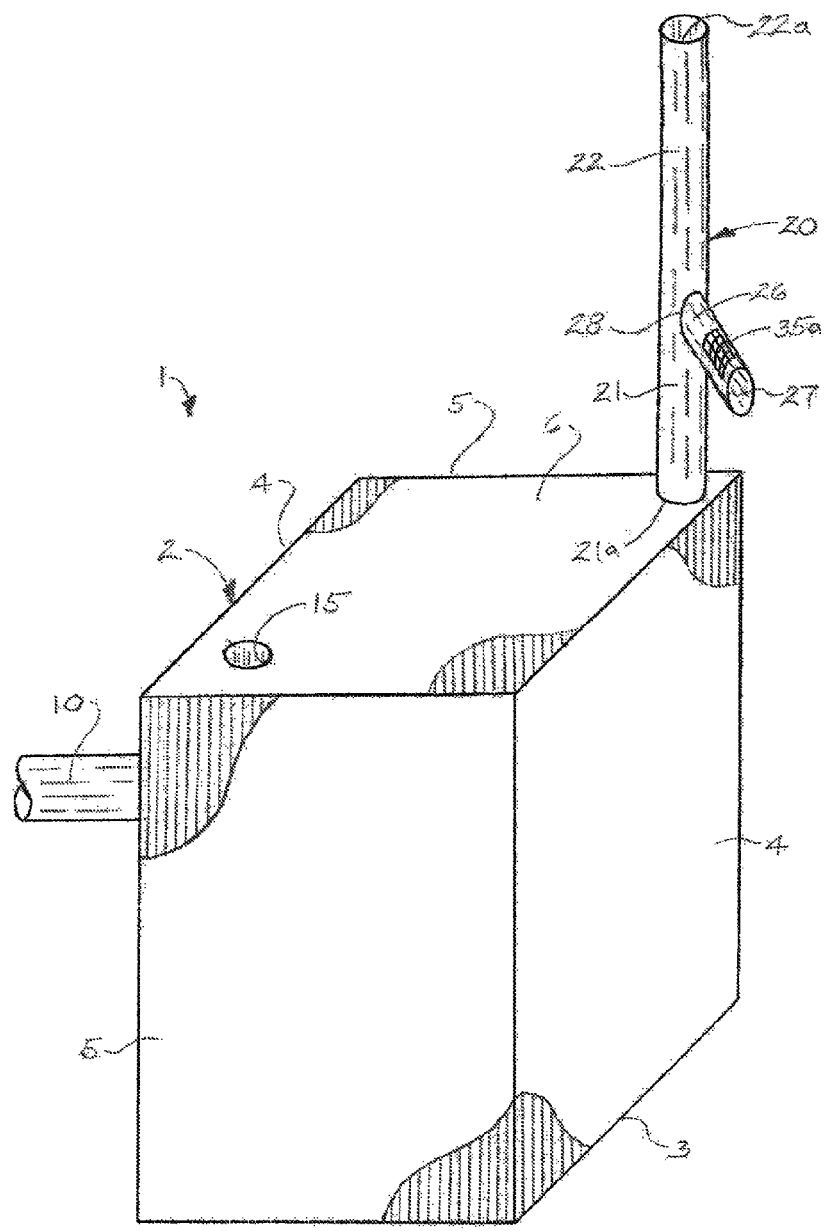
FIG. 1 is a perspective view of an illustrative embodiment of the wastewater pump station venting system.
Figure 2:
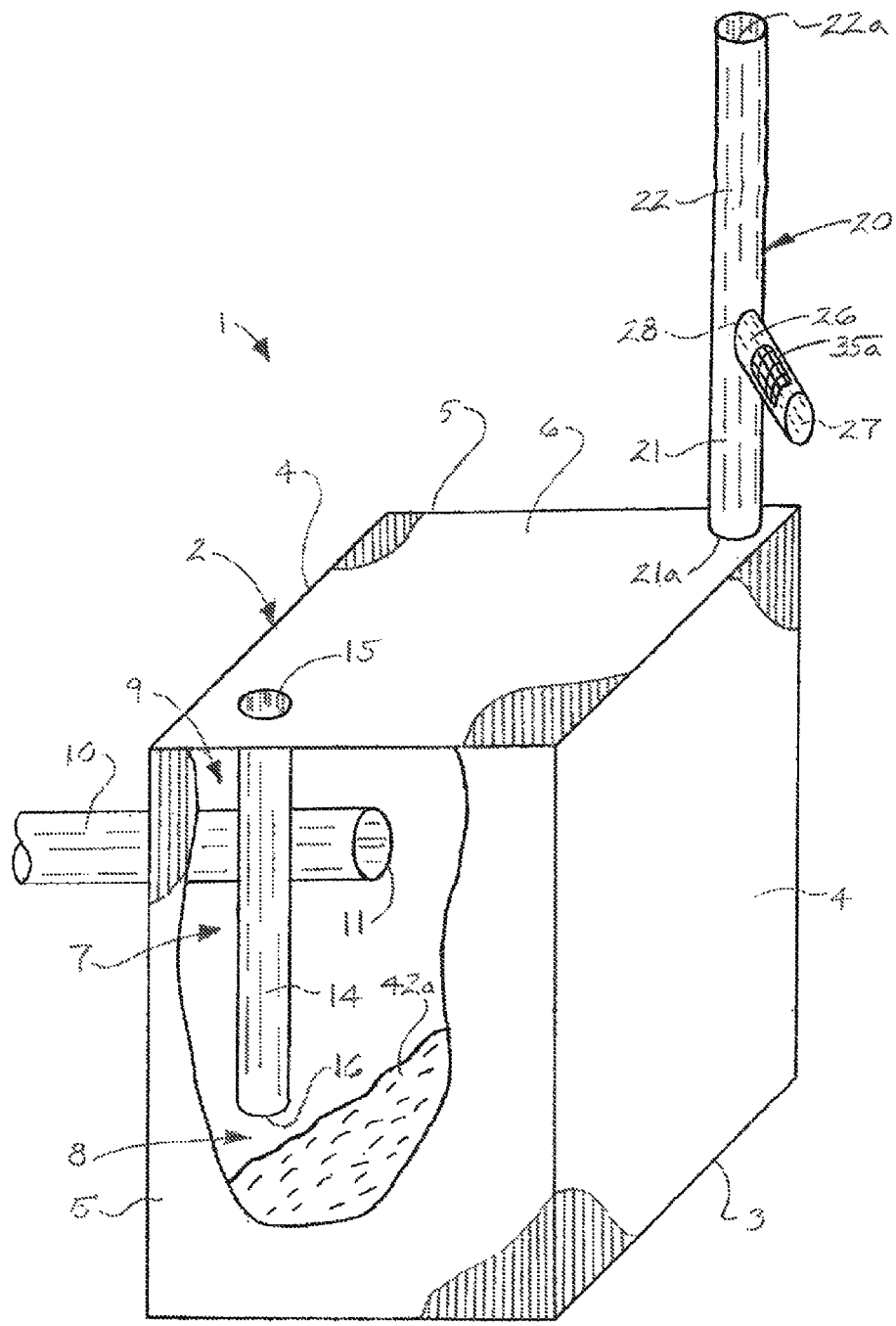
FIG. 2 is a perspective view, partially in section, of an illustrative embodiment of the wastewater pump station venting system.
Figure 3:
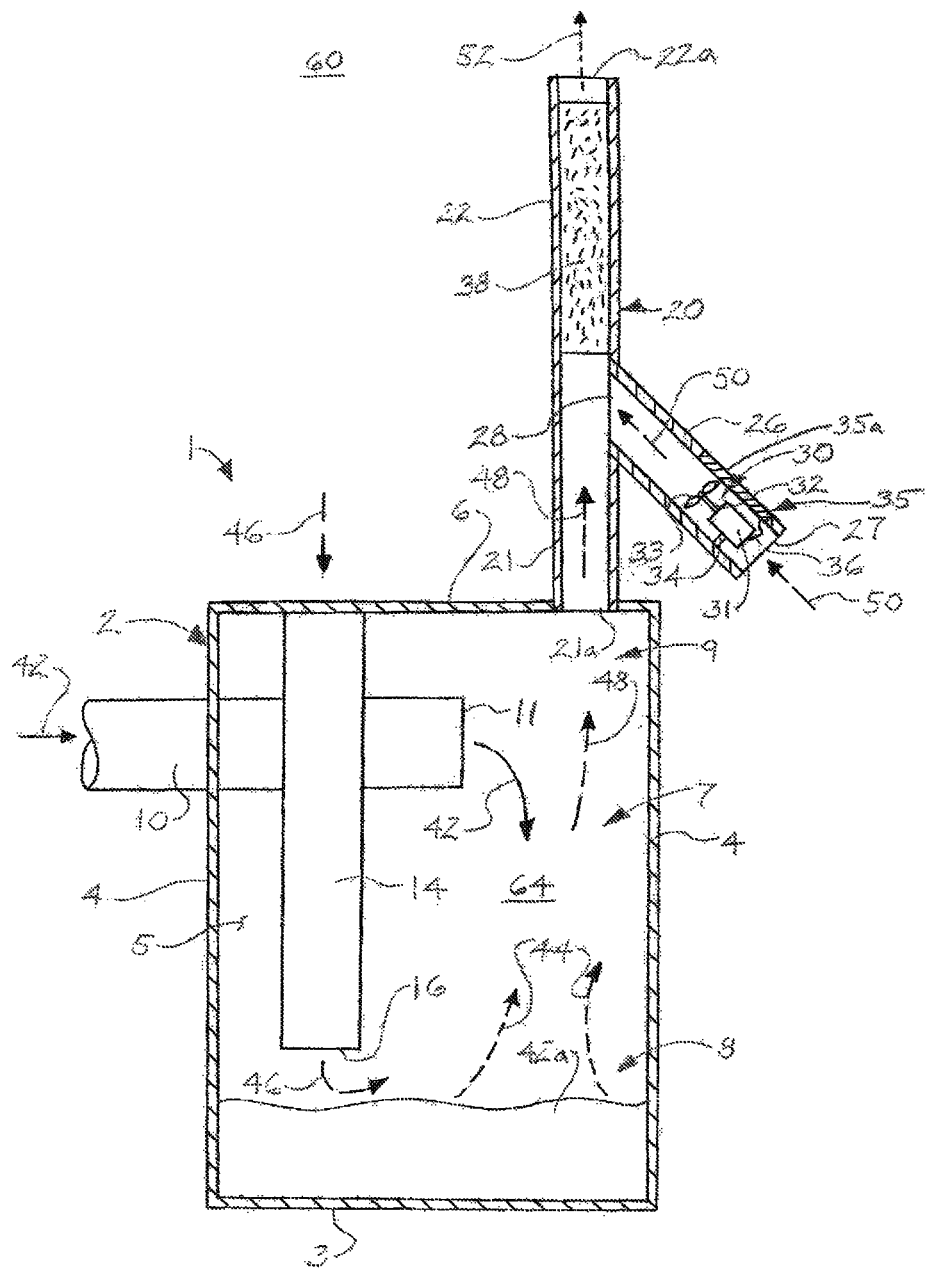
FIG. 3 is a sectional view illustrating interior components of the wastewater pump station venting system.

Referring to the drawings, an illustrative embodiment of the wastewater pump station venting system, hereinafter system, is generally indicated by reference numeral 1. As illustrated in FIGS. 1-3, the system 1 may include at least one wastewater discharge conduit 10. The wastewater discharge conduit 10 may be part of a network of conduits which convey streams of wastewater 42 (FIG. 3) from residences or businesses in a sanitary sewer system. A wastewater pump station 2 is disposed in fluid communication with the wastewater discharge conduit 10. The wastewater pump station 2 includes one or more pumps (not illustrated) which pump the stream of wastewater 42 (FIG. 3) through the conduits in the sanitary sewer system. In application of the system 1, which will be hereinafter described, the wastewater pump station 2 temporarily contains a quantity of the wastewater 42a (FIGS. 2 and 3) from the stream of wastewater 42 and then pumps the wastewater 42a to a wastewater treatment facility (not illustrated) in the sanitary sewer system for treatment of the wastewater 42a, typically in the conventional manner. Sewer gases 44 such as hydrogen sulfide, ammonia, carbon dioxide, methane and hydrogen, for example and without limitation, typically emanate from the wastewater 42a into the wastewater pump station 2 as the wastewater 42a temporarily settles in the wastewater pump station 2. The sewer gases 44 may have a tendency to corrode the functional and structural components of the wastewater pump station 2, and therefore, require efficient removal to minimize the maintenance or replacement needs of the wastewater pump station 2.

As illustrated in FIGS. 2 and 3, in some embodiments, the wastewater pump station 2 may generally include a bottom panel 3, a pair of spaced-apart side panels 4 and a pair of spaced-apart end panels 5 extending upwardly from the bottom panel 3, and a top panel 6 supported by the side panels 4 and the end panels 5. The bottom panel 3, the side panels 4, the end panels 5 and the top panel 6 may include steel, concrete and/or other suitable material which is known by those skilled in the art as being suitable for fabrication of wastewater pump stations in sewer systems. In other embodiments, the wastewater pump station 2 may have alternative designs. The wastewater pump station 2 has a station interior 7 which is disposed in fluid communication with the wastewater discharge conduit 10. The station interior 7 may have a lower station interior portion 8 and an upper station interior portion 9 above the lower station interior portion 8. In some embodiments, the wastewater discharge conduit 10 may enter the station interior 7 through one of the side panels 4 of the wastewater pump station 2, as illustrated. The wastewater discharge conduit 10 has a wastewater conduit discharge end 11 which may be disposed in fluid communication with the upper station interior portion 9, as illustrated, or alternatively, the lower station interior portion 8 of the station interior 7.

At least one fresh air inlet conduit 14 is disposed in fluid communication with the station interior 7 of the wastewater pump station 2. The fresh air inlet conduit 14 may have a fresh air conduit discharge end 16 which is disposed in fluid communication with the lower station interior portion 8 of the station interior 7. In some embodiments, the fresh air inlet conduit 14 may be generally vertically disposed in the station interior 7. Accordingly, the fresh air inlet conduit 14 may include a fresh air inlet opening 15 (FIG. 2) which extends through the top panel 6 of the wastewater pump station 2, with the fresh air conduit discharge end 16 terminating in the lower station interior portion 8 of the station interior 7 just above the water line of the wastewater 42a. In application of the system 1, which will be hereinafter described, the fresh air inlet conduit 14 conveys a stream of fresh air 46 (FIG. 3) from the atmosphere 60 outside the wastewater pump station 2 and discharges the stream of fresh air 46 into the lower station interior portion 8 of the station interior 7 responsive to induction of reduced pressure 64 in the station interior 7 as will be hereinafter described. Since they are typically heavier than air, the sewer gases 44 which emanate from the wastewater 42a may settle over the wastewater 42a in the lower station interior portion 8 of the station interior 7. As illustrated in FIG. 3, in the lower station interior portion 8, the stream of fresh air 46 which is discharged from the fresh air inlet conduit 14 may mix with the sewer gases 44 to form a gas/air mixture 48.

At least one gas vent conduit 20 includes a vent conduit inlet segment 21 having an inlet end 21a which is disposed in fluid communication with the station interior 7 of the wastewater pump station 2. A vent conduit outlet segment 22 of the gas vent conduit 20 is disposed in fluid communication with the vent conduit inlet segment 21 and has an discharge end 22a which typically opens to the atmosphere 60. In some embodiments, the gas vent conduit 20 may extend upwardly from the wastewater pump station 2, as illustrated. The inlet end 21a of the vent conduit inlet segment 21 may be disposed in fluid communication with the upper station interior portion 9 of the station interior 7 through the top panel 6 of the pump station 2. The discharge end 22a of the vent conduit outlet segment 22 may be disposed at a height of several feet (such as at least about 7 feet, for example and without limitation) from the ground (not illustrated).

Figures 4, 5:
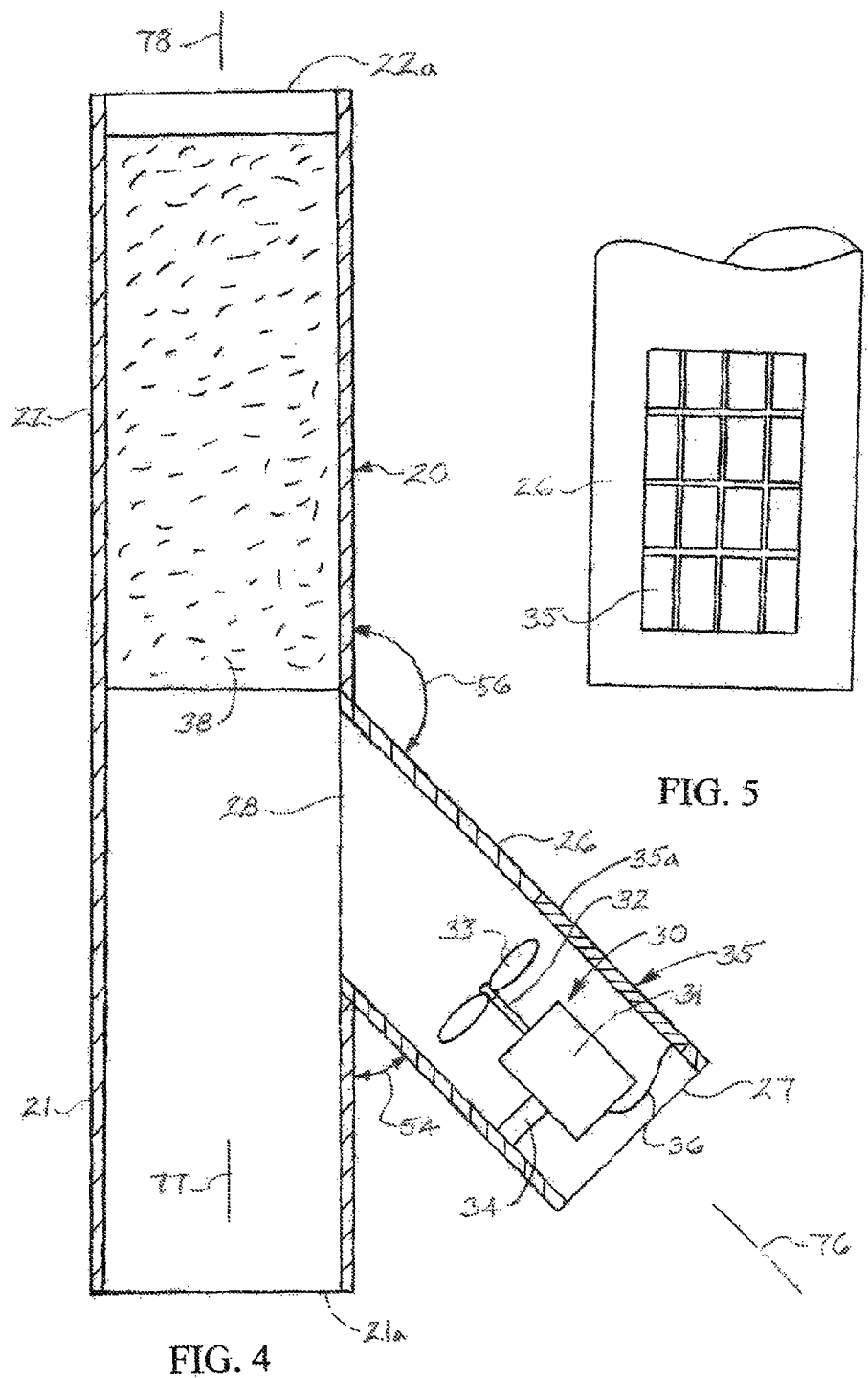
FIG. 4 is a longitudinal sectional view of a typical gas vent conduit and vent air inlet conduit according to an illustrative wastewater pump station venting system.
FIG. 5 is a top view of a solar panel provided on the vent air inlet conduit (shown partially in section) according to an illustrative wastewater pump station venting system.

At least one vent air inlet conduit 26 has an inlet end 27 and an outlet end 28 which is opposite the inlet end 27 and is disposed in fluid communication with the gas vent conduit 20 generally between the vent conduit inlet segment 21 and the vent conduit outlet segment 22. As illustrated in FIG. 4, the vent air inlet conduit 26 has a longitudinal axis 76 which is disposed at an acute angle 54 relative to a longitudinal axis 77 of the vent conduit inlet segment 21 and at an obtuse angle 56 relative to a longitudinal axis 78 of the vent conduit outlet segment 22 of the gas vent conduit 20. At least one vent fan 30 is disposed in the vent air inlet conduit 26. In some embodiments, the vent fan 30 may include a fan motor 31 which may be secured inside the vent air inlet conduit 26 via at least one fan motor mount 34, a fan shaft 32 drivingly engaged by the fan motor 31 and fan blades 33 drivingly engaged by the fan shaft 32.

Figure 3A:
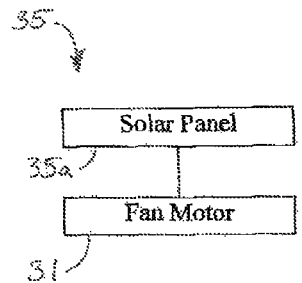
FIG. 3A is a functional block diagram of a typical power source for a vent fan which is suitable for implementation of an illustrative embodiment of the wastewater pump station venting system.
Figure 3D:
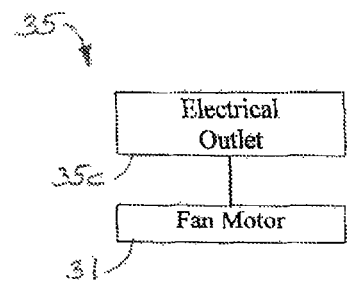
FIG. 3D is a functional block diagram of still another alternative power source for a vent fan which is suitable for implementation of an illustrative embodiment of the wastewater pump station venting system.
Figure 3B:
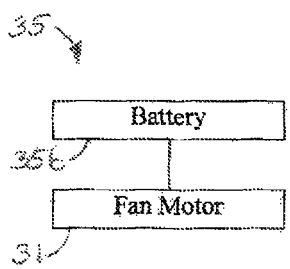
FIG. 3B is a functional block diagram of an alternative power source for a vent fan which is suitable for implementation of an illustrative embodiment of the wastewater pump station venting system.
Figure 3E:
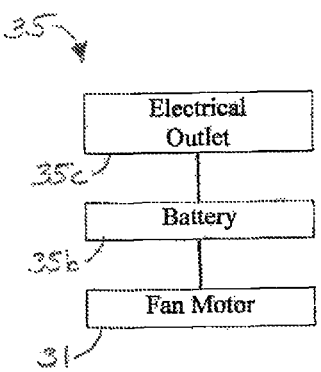
FIG. 3E is a functional block diagram of yet another alternative power source for a vent fan which is suitable for implementation of an illustrative embodiment of the wastewater pump station venting system.
Figure 3C:
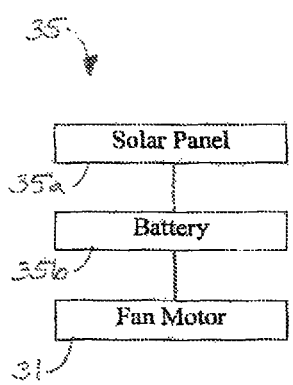
FIG. 3C is a functional block diagram of another alternative power source for a vent fan which is suitable for implementation of an illustrative embodiment of the wastewater pump station venting system.

A power source 35 electrically interfaces with the fan motor 31 of the vent fan 30 such as through wiring 36. As illustrated in FIG. 3A, in some embodiments, the power source 35 may include at least one solar panel 35a which interfaces with the fan motor 31. The solar panel 35a may be provided on the vent air inlet conduit 26, as illustrated, and provides a continuous source of electrical current to the fan motor 31 during daylight. As illustrated in FIG. 3B, in some embodiments, the power source 35 may include at least one battery 35b which supplies electrical current to the fan motor 31. As illustrated in FIG. 3C, in some embodiments, the power source 35 may include at least one solar panel 35a which electrically interfaces with at least one battery 35b. The battery 35b electrically interfaces with the fan motor 31 such that the solar panel 35a supplies electrical current which is stored in the battery 35b and the battery 35b provides a continuous supply of electrical current to the fan motor 31. As illustrated in FIG. 3D, in some embodiments, the power source 35 may include an electrical outlet 35c which electrically interfaces with the fan motor 31. The electrical outlet 35c may be a standard 120-volt electrical outlet. As illustrated in FIG. 3E, in some embodiments, the power source 35 may include at least one rechargeable battery 35b which electrically interfaces with an electrical outlet 35c. The fan motor 31 may electrically interlace with the battery 35b.

Figure 6:
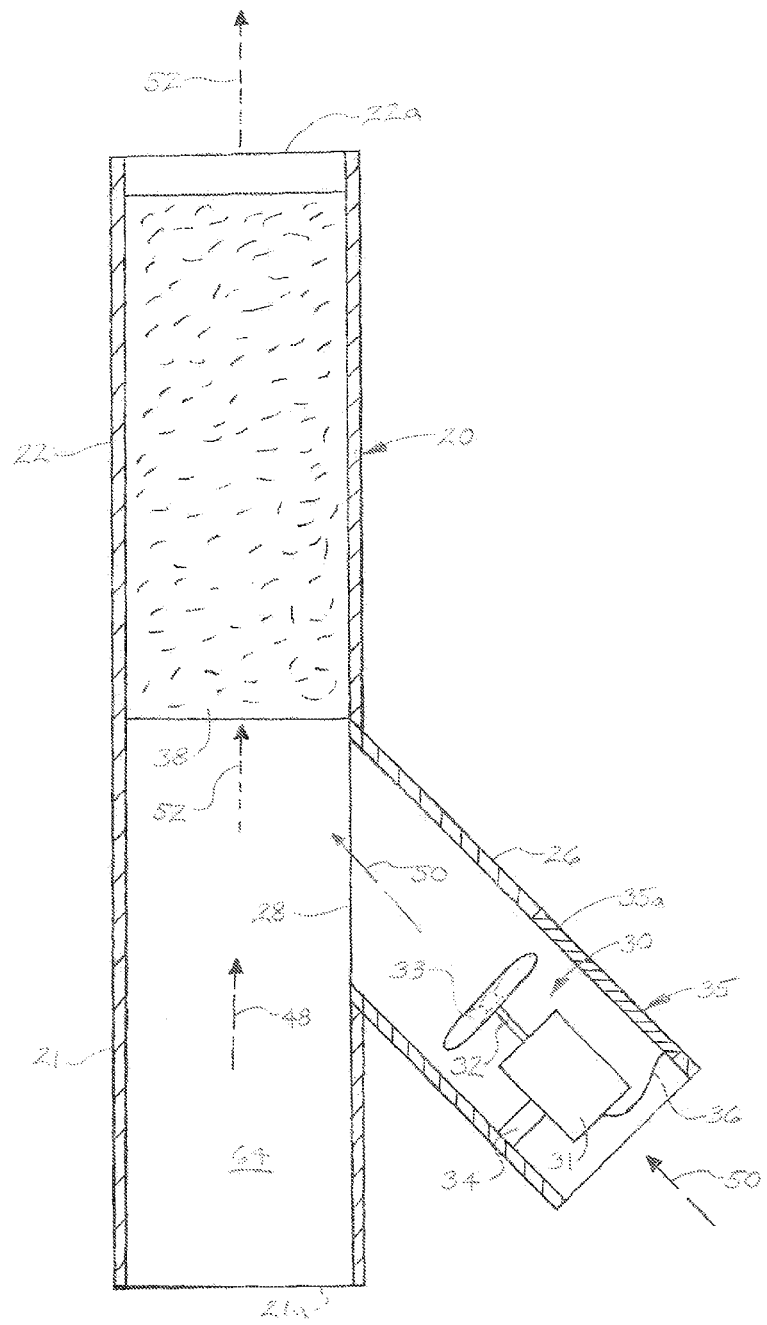
FIG. 6 is a longitudinal sectional view of a typical gas vent conduit and vent air inlet conduit according to an illustrative wastewater pump station venting system, more particularly illustrating typical flow of a vent air stream from the vent air inlet conduit into the gas vent conduit and consequent flow of a gas/air mixture stream through the gas vent conduit due to reduced pressure in the gas vent conduit.

As illustrated in FIGS. 3 and 6, upon operation of the vent fan 30, the fan motor 31 rotates the fan blades 33 via the fan shaft 32. The rotating fin blades 33 draw a stream of vent air 50 through the vent air inlet conduit 26 and force the stream of vent air 50 first into the vent conduit inlet segment 21 and then through the vent conduit outlet segment 22 of the gas vent conduit 20. The flowing stream of vent air 50 induces reduced pressure 64 in the vent conduit inlet segment 21 of the gas vent conduit 20 and in the station interior 7 of the wastewater pump station 2. The reduced pressure 64 draws a stream of gas/air mixture 48 from the station interior 7 into and through the vent conduit inlet segment 21 of the gas vent conduit 20. In the vent conduit outlet segment 22 of the gas vent conduit 20, the stream of gas/air mixture 48 combines with the stream of vent air 50 from the vent air inlet conduit 26 to form a discharged gas/air mixture stream 52 which is discharged from the discharge end 22a of the vent conduit outlet segment 22. The vent fan 30, disposed in the vent air inlet conduit 26, remains isolated from the stream of gas/air mixture 48 and the discharged gas/air mixture stream 52 as they flow through the gas vent conduit 20.

As illustrated in FIGS. 3, 4 and 6, in some embodiments, at least one odor-absorbing filter 38 may be disposed in the gas vent conduit 20, such as in the vent conduit outlet segment 22. The odor-absorbing filter 38 filters odiferous substances from the discharged gas/air mixture stream 52 before the discharged gas/air mixture stream 52 is discharged from the discharge end 22a of the vent conduit outlet segment 22 of the gas vent conduit 20. In some embodiments, the odor-absorbing filter 38 may be a carbon-type odiferous filter and may include volcanic rock.

Referring next to FIGS. 3 and 6 of the drawings, in exemplary application of the system 1, the wastewater discharge conduit 10 conveys a stream of wastewater 42 into the lower station interior portion 8 of the station interior 7 in the wastewater pump station 2. Before it is pumped to a wastewater treatment facility (not illustrated), the wastewater 42a may temporarily settle in or flow through the lower station interior portion 8. Sewer gases 44 may emanate from the settled wastewater 42a into the station interior 7.

The vent fan 30 is operated to draw the stream of vent air 50 through the vent air inlet conduit 26 into the vent conduit inlet segment 21 of the gas vent conduit 20 as the power source 35 supplies electrical current to the fan motor 31. The reduced pressure 64 which the flowing stream of vent air 50 induces in the vent conduit inlet segment 21 and in the station interior 7 of the wastewater pump station 2 draws a stream of gas/air mixture 48 from the station interior 7 into the vent conduit inlet segment 21. In the vent conduit inlet segment 21, the stream of gas/air mixture 48 combines with the incoming stream of vent air 50 from the vent air inlet conduit 26, and the resulting discharged gas/air mixture stream 52 first flows through the odor-absorbing filter 38 in the vent conduit outlet segment 22 of the gas vent conduit 20 and then is discharged from the discharge end 22a of the vent conduit outlet segment 22 typically to the atmosphere 60. In embodiments in which the power source 35 includes at least one solar panel 35a (FIG. 3A), a continuous supply of electrical current may be supplied to the fan motor 31 during daytime for continuous operation of the vent fan 30 and removal of the sewer gases 44 from the wastewater pump station 2. In some embodiments, the power source 35 may include at least one solar panel 35a which electrically interfaces with at least one battery 35b that electrically interfaces with the fan motor 31, as illustrated in FIG. 3C, to supply electrical current to the fan motor 31 continuously during a 24-hour period.

It will be appreciated by those skilled in the art that the system 1 substantially reduces the maintenance and/or replacement needs of a wastewater pump station 2 in a wastewater treatment system. Because in some embodiments the fresh air inlet conduit 14 discharges the stream of fresh air 46 into the lower station interior portion 8 of the station interior 7, the stream of fresh air 46 lifts the sewer gases 44 from the lower station interior portion 8 in the stream of gas/air mixture 48 and discharges the sewer gases 44 from the gas vent conduit 20 in the discharged gas/air mixture stream 52 responsive to operation of the vent fan 30. This expedient prevents or substantially reduces concentration of the sewer gases 44 in the station interior 7 and premature corrosion of the wastewater pump station 2 and its components which could otherwise result. Moreover, it will be further appreciated by those skilled in the art that the vent fan 30 remains isolated from the stream of gas/air mixture 48 and the discharged gas/air mixture stream 52 flowing through the gas vent conduit 20 as it forces the stream of vent air 50 from the vent air inlet conduit 26 into the gas vent conduit 20. Consequently, the stream of gas/air mixture 48 and the discharged gas/air mixture stream 52 cannot contact and corrode the vent fan 30, substantially prolonging the operational life of the vent fan 30.

Figure 7:
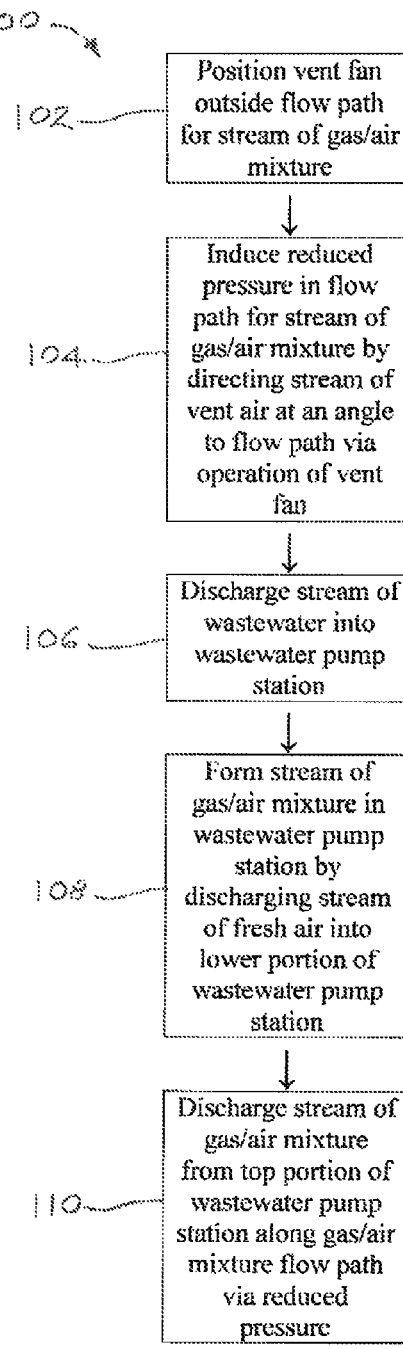
FIG. 7 is a flow diagram of an illustrative embodiment of a wastewater pump station venting method.

Referring next to FIG. 7 of the drawings, a flow diagram of an illustrative embodiment of a wastewater pump station venting method is generally indicated by reference numeral 100. At block 102 of the method, a vent fan is positioned outside a flow path for a stream of gas/air mixture which is to be discharged from a wastewater pump station. At block 104, reduced pressure is induced in the flow path for the stream of gas/air mixture by directing the stream of vent air at an angle to the flow path via operation of the vent fan. At block 106, a stream of wastewater is discharged into the wastewater pump station. At block 108, a stream of gas/air mixture is formed in the wastewater pump station by discharging a stream of fresh air into a lower portion of the wastewater pump station via the reduced pressure. At block 110, the stream of gas/air mixture is discharged from the top portion of the wastewater pump station along the gas/air mixture flow path via the reduced pressure.

Figure 8:
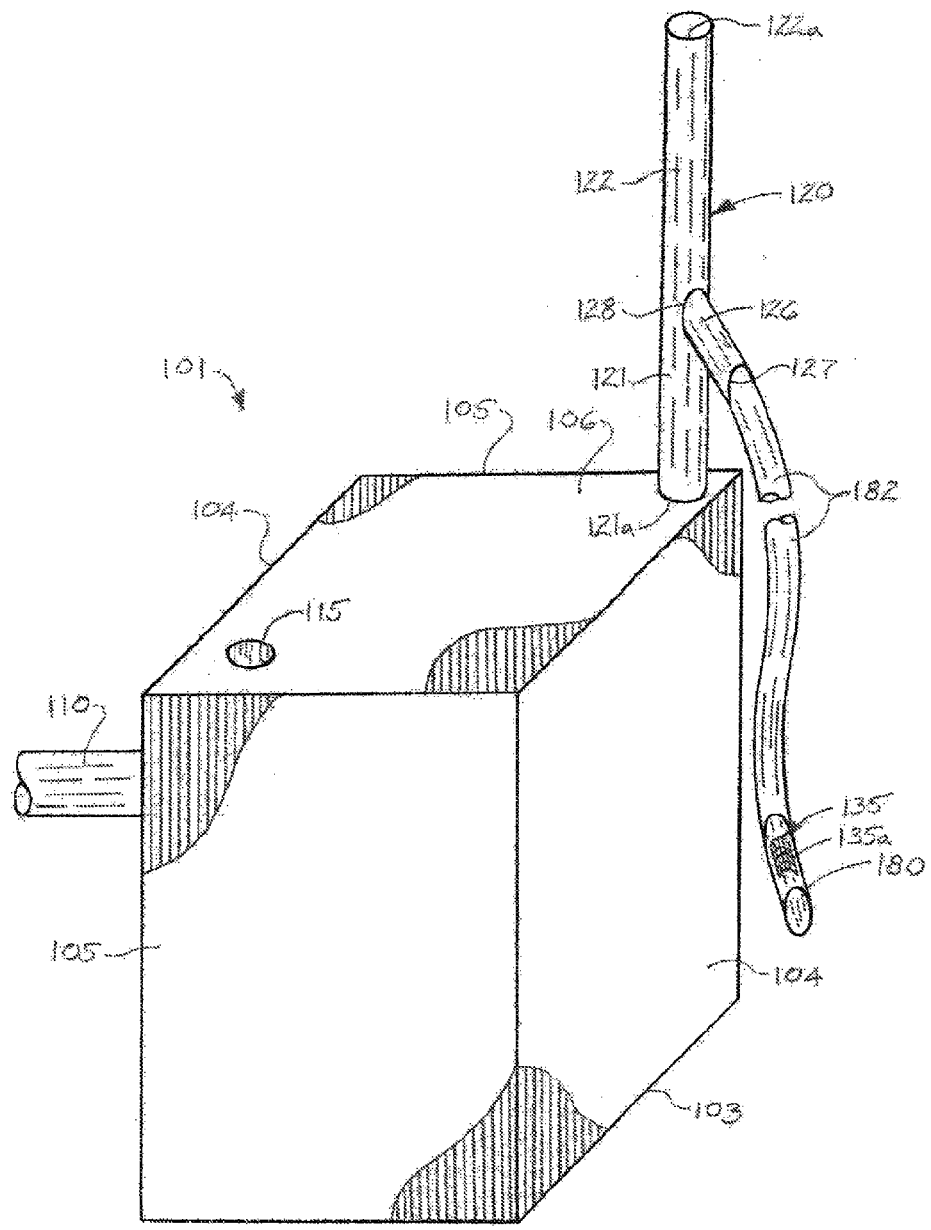
FIG. 8 is a perspective view, partially in section, of an alternative illustrative embodiment of the wastewater pump station venting system.
Figure 9:
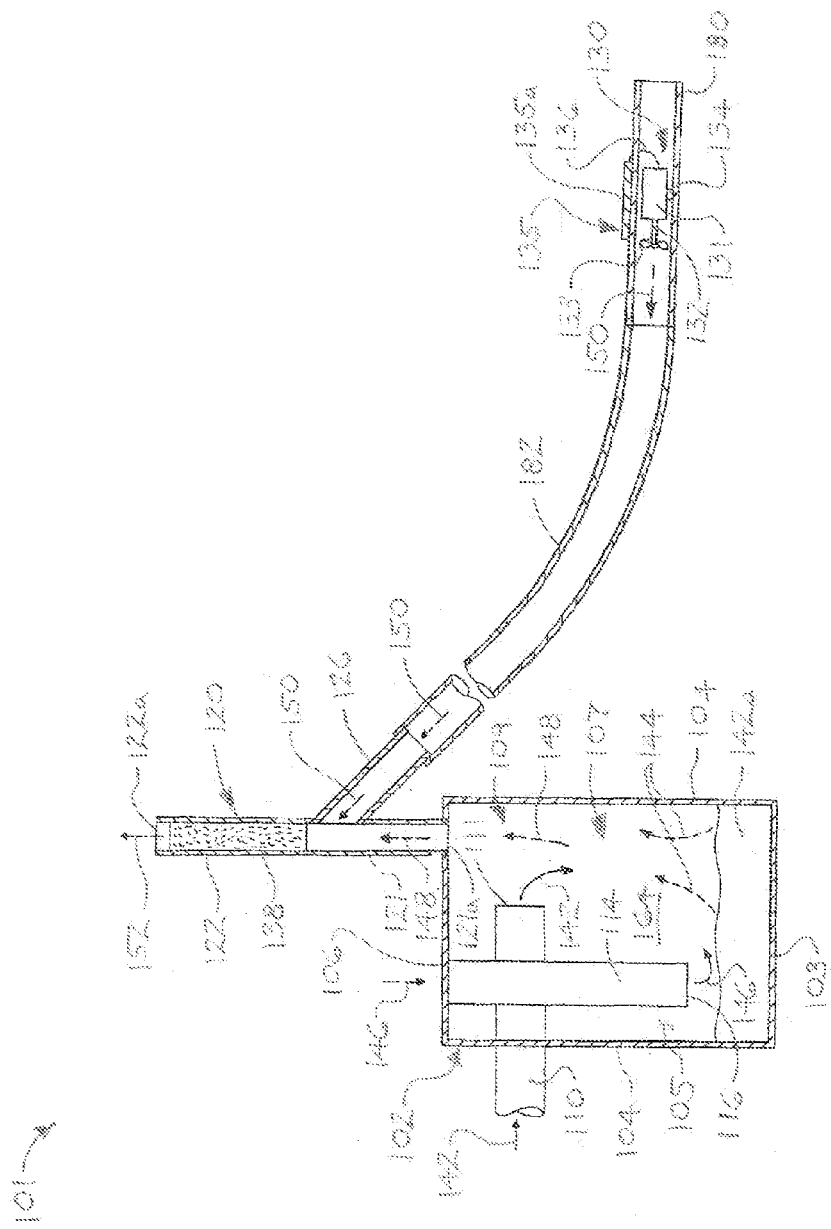
FIG. 9 is a sectional view illustrating interior components of the wastewater pump station venting system illustrated in FIG. 8.

Referring next to FIGS. 8 and 9 of the drawings, an alternative illustrative embodiment of the wastewater pump station venting system is generally indicated by reference numeral 101. In the system 101, elements which are analogous to the respective elements of the assembly 1 that was heretofore described with respect to FIGS. 1-6 are designated by the same numeral in the 101-199 series in FIGS. 8 and 9. A generally elongated fan conduit 182 may be disposed in fluid communication with the vent air inlet conduit 126. In some embodiments, the fan conduit 182 may include rubber or other flexible material. In other embodiments, the fan conduit 182 may be a rigid or semi-rigid material. A fan housing 180 may be disposed in fluid communication with the vent air inlet conduit 126. As illustrated in FIG. 9, at least one vent fan 130 may be provided in the fan housing 180. Accordingly, operation of the system 101 may be as was heretofore described with respect to the system 1 in FIGS. 1-7. The vent fan 130 forces a stream of vent air 150 from the fan housing 180 through the fan conduit 182 and the vent air inlet conduit 126, respectively, into the vent conduit inlet segment 121 of the gas vent conduit 120 as was heretofore described with respect to the system 1. The fan conduit 182 substantially isolates the vent fan 130 from the stream of gas/air mixture 148 and the discharged gas/air mixture stream 152 flowing through the gas vent conduit 120. The fan conduit 182 also isolates the vent fan 130 from sewer gas 144 in the wastewater pump station 102 during periods in which the vent fan 130 is not in operation.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A wastewater pump station venting system, comprising:
   at least one wastewater discharge conduit;
   a wastewater pump station having a station interior disposed in fluid communication with the wastewater discharge conduit;
   at least one fresh air inlet conduit disposed in fluid communication with the station interior;
   at least one gas vent conduit having a vent conduit inlet segment disposed in fluid communication with the station interior and a vent conduit outlet segment disposed in fluid communication with the vent conduit inlet segment;
   at least one vent air inlet conduit disposed in fluid communication with the gas vent conduit between the vent conduit inlet segment and the vent conduit outlet segment, the vent air inlet conduit disposed at an acute angle relative to the vent conduit inlet segment and an obtuse angle relative to the vent conduit outlet segment;
   at least one vent fan disposed in the vent air inlet conduit; and
   at least one power source electrically interfacing with the vent fan.

2. The wastewater pump station venting system of claim 1 further comprising at least one odor-absorbing filter in the gas vent conduit.

3. The wastewater pump station of claim 2 wherein the odor-absorbing filter is disposed within the vent conduit outlet segment of the gas vent conduit.

4. The wastewater pump station of claim 2 wherein the odor-absorbing filter comprises volcanic rock.

5. The wastewater pump station of claim 1 wherein the power source comprises at least one solar panel.

6. The wastewater pump station of claim 5 wherein the solar panel is carried by the vent air inlet conduit.

7. The wastewater pump station of claim 1 wherein the fresh air inlet conduit extends into the station interior.

8. The wastewater pump station of claim 1 wherein the vent fan comprises a fan motor carried by the vent air inlet conduit, a fan shaft drivingly engaged by the fan motor and fan blades drivingly engaged by the fan shaft.

9. A wastewater pump station venting system, comprising:
   at least one wastewater discharge conduit;
   a wastewater pump station having a station interior disposed in fluid communication with the wastewater discharge conduit, the station interior including a lower station interior portion and an upper station interior portion above the lower station interior portion;
   at least one fresh air inlet conduit disposed in fluid communication with the lower station interior portion of the station interior;
   at least one gas vent conduit having a vent conduit inlet segment disposed in fluid communication with the upper station interior portion of the station interior and a vent conduit outlet segment disposed in fluid communication with the vent conduit inlet segment, the gas vent conduit adapted to convey a stream of gas/air mixture;
   at least one vent air inlet conduit disposed in fluid communication with the gas vent conduit between the vent conduit inlet segment and the vent conduit outlet segment, the vent air inlet conduit disposed at an acute angle relative to the vent conduit inlet segment and an obtuse angle relative to the vent conduit outlet segment;
   at least one vent fan disposed in the vent air inlet conduit, the vent fan isolated from the stream of gas/air mixture in the gas vent conduit; and
   at least one power source electrically interfacing with the vent fan.

10. The wastewater pump station venting system of claim 9 further comprising at least one odor-absorbing filter in the gas vent conduit.

11. The wastewater pump station of claim 10 wherein the odor-absorbing filter is disposed within the vent conduit outlet segment of the gas vent conduit.

12. The wastewater pump station of claim 10 wherein the odor-absorbing filter comprises volcanic rock.

13. The wastewater pump station of claim 9 wherein the power source comprises at least one solar panel.

14. The wastewater pump station of claim 13 wherein the solar panel is carried by the vent air inlet conduit.

15. The wastewater pump station of claim 9 wherein the fresh air inlet conduit extends into the station interior.

16. The wastewater pump station of claim 9 wherein the vent fan comprises a fan motor carried by the vent air inlet conduit, a fan shaft drivingly engaged by the fan motor and fan blades drivingly engaged by the fan shaft.

17. A wastewater pump station venting system, comprising:
   at least one wastewater discharge conduit, the wastewater discharge conduit conveys a stream of wastewater;
   a wastewater pump station having a station interior disposed in fluid communication with the wastewater discharge conduit, the station interior including a lower station interior portion and an upper station interior portion above the lower station interior portion, the lower station interior portion contains a quantity of wastewater from the stream of wastewater;
   at least one fresh air inlet conduit disposed in fluid communication with the lower station interior portion of the station interior, the fresh air inlet conduit extending vertically through the station interior and having a fresh air conduit discharge end disposed in fluid communication with the lower station interior portion of the station interior, the fresh air inlet conduit conveys a stream of fresh air into the lower station interior portion;

at least one vertical gas vent conduit having a vent conduit inlet segment disposed in fluid communication with the upper station interior portion of the station interior and a vent conduit outlet segment disposed in fluid communication with the vent conduit inlet segment, the gas vent conduit conveys a stream of gas/air mixture resulting from mixing of the stream of wastewater and the stream of fresh air from the station interior;

at least one vent air inlet conduit disposed in fluid communication with the gas vent conduit between the vent conduit inlet segment and the vent conduit outlet segment, the vent air inlet conduit disposed at an acute angle relative to the vent conduit inlet segment and an obtuse angle relative to the vent conduit outlet segment, the vent air inlet conduit conveys a stream of vent air into the vent conduit outlet segment of the gas vent conduit;

the stream of vent air induces reduced pressure in the vent conduit inlet segment of the gas vent conduit and the station interior and the reduced pressure generates and draws the stream of gas/air mixture from the station interior into and through the gas vent conduit;

a fan conduit disposed in fluid communication with the vent air inlet conduit;

a fan housing disposed in fluid communication with the fan conduit;

at least one vent fan disposed in the fan housing, the vent fan isolated from the stream of gas/air mixture in the gas vent conduit and the vent fan generates the stream of vent air through the fan conduit and the vent air inlet conduit, respectively; and at least one power source electrically interfacing with the vent fan.

18. The wastewater pump station venting system of claim 17 further comprising at least one odor-absorbing filter in the vent conduit outlet segment of the gas vent conduit.

19. The wastewater pump station venting system of claim 18 wherein the odor-absorbing filter comprises volcanic rock.

20. The wastewater pump station of claim 17 wherein the power source comprises at least one solar panel.

21. A wastewater pump station venting method, comprising:
providing system of claim 1;
positioning a vent fan outside a flow path for a stream of gas/air mixture to be discharged from a wastewater pump station;
inducing reduced pressure in the flow path by directing a stream of vent air at an angle to the flow path via operation of the vent fan;
discharging a stream of wastewater into the wastewater pump station;
forming the stream of gas/air mixture in the wastewater pump station by discharging a stream of fresh air into the wastewater pump station; and
discharging the stream of gas/air mixture from the wastewater pump station along the flow path via the reduced pressure.

* * * * *